United States Patent
Strömbergsson

(10) Patent No.: US 11,746,752 B2
(45) Date of Patent: Sep. 5, 2023

(54) METHOD AND SYSTEM FOR DETECTING MACHINE DEFECTS

(71) Applicant: Aktiebolaget SKF, Gothenburg (SE)

(72) Inventor: Stig Erik Daniel Strömbergsson, Älvsbyn (SE)

(73) Assignee: Aktiebolaget SKF, Gothenburg (SE)

( * ) Notice: Subject to any disclaimer, the term of this patent is extended or adjusted under 35 U.S.C. 154(b) by 120 days.

(21) Appl. No.: 17/380,106

(22) Filed: Jul. 20, 2021

(65) Prior Publication Data
US 2022/0074391 A1 Mar. 10, 2022

(30) Foreign Application Priority Data
Sep. 7, 2020 (DE) .................. 102020211196.0

(51) Int. Cl.
| | |
|---|---|
| *F03D 17/00* | (2016.01) |
| *F03D 80/50* | (2016.01) |
| *G01M 13/045* | (2019.01) |
| *G01M 99/00* | (2011.01) |
| *G05B 23/00* | (2006.01) |
| *G06N 3/02* | (2006.01) |
| *G06N 20/00* | (2019.01) |

(52) U.S. Cl.
CPC ............. *F03D 17/00* (2016.05); *F03D 80/50* (2016.05); *G01M 13/045* (2013.01); *G01M 99/005* (2013.01); *G05B 23/00* (2013.01); *G06N 3/02* (2013.01); *G06N 20/00* (2019.01); *F05B 2260/80* (2013.01); *F05B 2270/709* (2013.01)

(58) Field of Classification Search
CPC .... G01M 13/00; G01M 13/04; G01M 13/045; G01M 99/005; G05B 19/406; G05B 2219/34465; G05B 23/00; G01R 31/34
See application file for complete search history.

(56) References Cited

U.S. PATENT DOCUMENTS

| | | | |
|---|---|---|---|
| 2011/0313726 A1* | 12/2011 | Parthasarathy | F03D 80/50 702/179 |
| 2018/0348303 A1* | 12/2018 | Unnikrishnan | G01H 3/12 |
| 2020/0263669 A1* | 8/2020 | Shinkawa | G01M 99/005 |
| 2021/0055706 A1* | 2/2021 | Hiruta | G05B 19/0428 |
| 2023/0003198 A1* | 1/2023 | Dong | F03D 7/045 |

* cited by examiner

*Primary Examiner* — Manuel L Barbee
(74) *Attorney, Agent, or Firm* — GARCIA-ZAMOR INTELLECTUAL PROPERTY LAW, LLC; Ruy Garcia-Zamor

(57) ABSTRACT

A method for detecting at least one machine defect provides defining from the machine kinematic data at least one condition indicator reflecting its condition, recording operating condition data of the machine and condition monitoring data of the machine during a predetermined period when the machine is operating normally, determining condition indicator values using condition monitoring data, and for determining current condition indicator values from the at least one condition indicator and the current condition monitoring data, a machine learning algorithm, predicting condition indicator values with respect to the current operating condition data, training the machine learning algorithm to establish a relation between the operating condition data and condition indicator values, and comparing the current condition indicator values and the predicted condition indicator values, and for determining if the machine is presumed to operate normally or not according to the result of the comparison.

6 Claims, 2 Drawing Sheets

METHOD AND SYSTEM FOR DETECTING MACHINE DEFECTS

CROSS-REFERENCE TO RELATED APPLICATIONS

This application claims priority to German Patent Application no. 102020211196.0, filed Sep. 7, 2020, the contents of which is fully incorporated herein by reference.

TECHNICAL FIELD OF THE INVENTION

The present invention relates to machine diagnostics and more particularly to the detection of machine defects.

BACKGROUND OF THE INVENTION

Machine diagnostics are utilized to implement machine health monitoring. A main objective in machine diagnostics is to detect defects in machinery as early as possible.

Generally, condition indicators are monitored to detect machine defects, the condition indicators being defined from the machine kinematic parameters, In applications in which many operating parameters have a large influence on the machine behavior, it is difficult to determine if a change in a condition indicator is due to a machine defect or a change in operating conditions.

For example, rotating machine components such as the main bearing of a wind turbine are monitored to detect a defect with alarm levels set on the defined condition indicator value.

If the condition indicator values are fulfilling the alarm condition set, an alarm is triggered, indicating which component shat shows a defect.

Ideally, the condition indicator is only sensitive to the presence of a defect of the machine component that the condition indicator is aimed for.

However, when the wind turbine is operating the condition indicator values may fluctuate according to the wind turbine operating conditions, for example the absolute value and variance of rotational speed of the bearing, the power output of the wind turbine, the wind speed and the direction of the wind driving the blades.

To avoid false alarm triggering, alarm levels are set high enough to avoid variances caused by operating condition behaviors. The risk is that defects may not be detected leading to the destruction of the wind turbine.

SUMMARY OF THE INVENTION

There is a need to take into account the fluctuations in condition indicator values caused by operating condition behavior for the detection of machine defects and avoid false alarms being triggered.

According to an aspect, a method for at least one machine defect is proposed.

The method comprises:
a) defining from the machine kinematic data at least one condition indicator reflecting the condition of the machine, with respect to a defect to be monitored,
b) recording operating condition data of the machine and condition monitoring data of the machine during a predetermined time period during which the machine is operating normally and determining condition indicator values using the condition monitoring data,
c) training a machine learning algorithm to establish a relation between the operating condition data and the condition indicator values recorded during the predetermined time period,
d) recording current condition monitoring data and determining current condition indicator values from the at least one condition indicator and the current condition monitoring data,
e) predicting condition indicator values with respect to the current operating condition data by the machine learning algorithm,
f) comparing the current condition indicator values and the predicted condition indicator values, and
g) determining if the machine is presumed to operate normally or not according to the result of the comparison.

The current operating conditions of the machine are taken into account to make detection of defects more accurate.

Preferably, comparing the current condition indicator values and the predicted condition indicator values comprises determining the difference between the current condition indicator values and the predicted condition indicator values, if the difference is within set limits, the machine is presumed to operate normally.

Advantageously, steps d), e), f) and g) are repeated as long as the machine is presumed to operate normally outside the predetermined period.

Preferably, comparing the current condition indicator values and the predicted condition indicator values comprises determining the difference between the current condition indicator values and the predicted condition indicator values, if the difference is outside set limits, the machine is presumed to have the monitored defect.

Advantageously, the machine learning algorithm comprises a neural network.

Preferably, the machine comprises a wind turbine comprising a bearing supporting blades of the wind turbine, operating condition data and current operating condition data comprising the rotational speed of the bearing, the power output of the wind turbine and/or the wind speed and the wind direction.

In another aspect, a system for detecting at least one machine defect is proposed.

The system comprises:
defining means for defining from the machine kinematic data at least one condition indicator reflecting the condition of the machine, with respect to a defect to be monitored
recording means for recording operating condition data of the machine and condition monitoring data of the machine during a predetermined period during which the machine is operating normally, and for recording current condition monitoring data,
determining means for determining condition indicator values using condition monitoring data, and for determining current condition indicator values from the at least one condition indicator and the current condition monitoring data,
a machine learning algorithm,
predicting means for predicting condition indicator values with respect to the current operating condition data by the machine learning algorithm,
training means for training the machine learning algorithm to establish a relation between the operating condition data and condition indicator values, and
comparing means for comparing the current condition indicator values and predicted condition indicator values and for determining if the machine is presumed to operate normally or not according to the result of the comparison.

Preferably, if the difference between the current condition indicator values and the predicted condition indicator values is within set limits, the comparing means are configured to generate a first signal indicative of the machine being presumed to operate normally.

Advantageously, if the difference between the current condition indicator values and the predicted condition indicator values is outside set limits, the comparing means are configured to generate a second signal indicative of the machine being presumed to have the monitored defect.

In another aspect, a wind turbine connected to a system as defined above is proposed.

BRIEF DESCRIPTION OF THE DRAWINGS

Other advantages and features of the invention will appear on examination of the detailed description of embodiments, in no way restrictive, and the appended drawings in which.

DETAILED DESCRIPTION OF THE INVENTION

Figure 1:
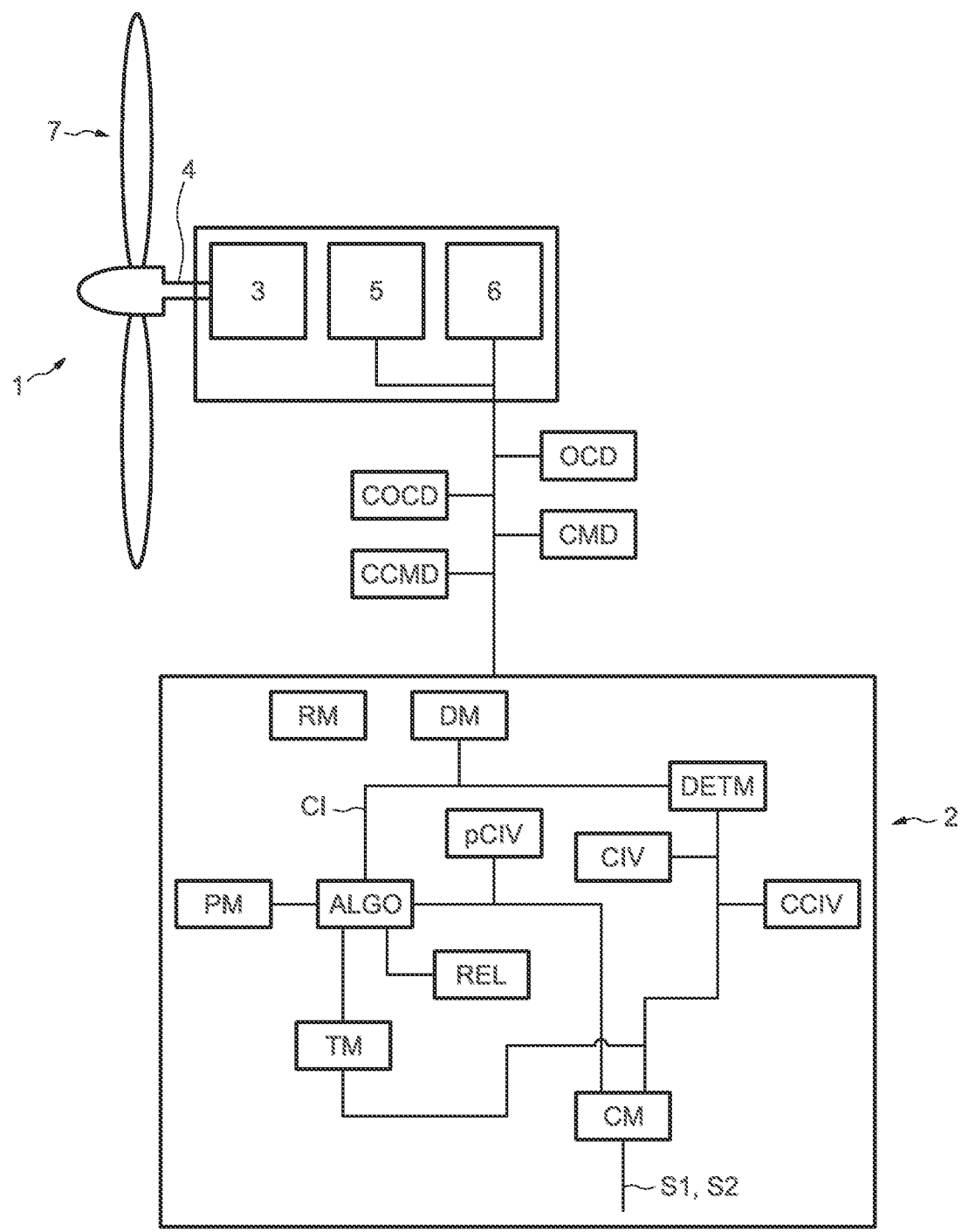
FIG. 1 illustrates schematically an embodiment of a system for detecting wind turbine defects according to the invention.

Reference is made to FIG. 1 which represents an example of a wind turbine 1 connected to an example of an embodiment of a system 2 for detecting at least one wind turbine defect.

Alternatively, the system 2 may be incorporated in the wind turbine 1.

The wind turbine 1 comprises a bearing 3 supporting the main shaft 4 of the wind turbine 1, operating condition sensor 5 and condition monitoring sensor 6.

The main shaft 4 supports blades 7.

The sensor 5 generates operating condition data OCD of the wind turbine 1, for example the absolute value and variance of rotational speed of the bearing 3, the power output of the wind turbine 1, the wind speed and the direction of the wind driving the blades 7.

The sensor 5 comprises for example speed sensors, power sensors and/or wind sensors.

The sensor 6 generates condition monitoring data CMD of the wind turbine 1.

The sensor 6 comprises for example an accelerometer generating vibrational data from the bearing 3.

The system 2 comprises:

defining means DM for defining from the wind turbine 1 kinematic data a condition indicator CI reflecting the condition of the wind turbine 1, with respect to a defect to be monitored, recording means RM for recording operating condition data OCD of the wind turbine 1 and condition monitoring data CMD of the wind turbine 1 during a predetermined period during which the wind turbine 1 is operating normally, and for recording current condition monitoring data CMD, determining means DETM for determining condition indicator values CIV using condition monitoring data CMD, and for determining current condition indicator values CCIV from the condition indicator CI and the current condition monitoring data CCMD, a machine learning algorithm ALGO, predicting means PM for predicting condition indicator values pCIV with respect to the current operating condition data COCD by the machine learning algorithm ALGO, training means TM for training the machine learning algorithm ALGO to establish a relation REL between the operating condition data OCD and condition indicator values CIV, and comparing means CM for comparing the current condition indicator values CCIV and the predicted condition indicator values pCIV, and for determining if the wind turbine 1 is presumed to operate normally or not according to the result of the comparison.

In the following, the bearing 3 is monitored to detect a defect of the bearing.

The condition indicator CI comprises for example the gear mesh frequency of the gear 3 equal to the main shaft speed times the number of teeth of the bearing 3, the number of teeth of the bearing 3 being a wind turbine kinematic data.

The machine learning algorithm ALGO may comprise for example a neural network.

The current operating condition data COCD of the wind turbine 1 are generated by the sensors 5 when the wind turbine 1 is operating outside the predetermined period, and the current condition monitoring data CCMD are generated by the sensors 5 when the wind turbine 1 is operating outside the predetermined period.

The comparing means CM generate a first signal S1 indicative of the bearing 3 being presumed to operate normally if the current condition indicator values CCI and the predicted condition indicator values pCI are within set limits.

When the current condition indicator values CCI and the predicted condition indicator values pCI are outside set limits, the comparing means CM generate a second signal S2, the second signal S2 being indicative of the bearing 3 being presumed to have the monitored defect.

The signals S1, S2 generated by the comparing means CM may be processed by a processing unit (not illustrate) which may for example stop the wind turbine 1 if the bearing 3 is defective or trigger an alarm.

The comparing means CM determine deviation values DEV.

For each current condition indicator value CCIV and associated predicted condition indicator value pCIV, the corresponding deviation value DEV is equal to:

$$DEV = CCIV - pCIV \qquad (1)$$

If the monitored defect occurs, the trend of condition indicator values CCIV is increasing, the trend of the predicted condition indicator values pCIV remaining stable. The trend of the deviation values DEV increases.

Tend method analysis of the deviations values DEV are implemented to determine if the monitored defect occurs.

An example to determine if the monitored defect occurs is exposed.

When the wind turbine 1 is operating outside the predetermined period, during a learning period, a set of deviation values DEV is recorded.

Set limits comprising a lower limit LL and an upper limit UL are determined.

The mean value $\mu$ and the standard deviation $\sigma$ of the set of deviation values DEV are determined.

The upper limit UL is equal to:

$$UL = \mu + X \cdot \sigma \qquad (2)$$

and the lower limit LL is equal to:

$$LL = \mu - X \cdot \sigma \quad (3)$$

where X is a detection factor.

X is for example comprised between 1 and 4 and is determined according to the detection sensitivity of the defect to be monitored.

For example, when the wind turbine 1 is operating, the predetermined period and the learning period being over, if M out of N values of the deviation values DEV are outside the set limits, the comparing means CM generate the second signal S2.

Otherwise the comparing means CM generate the first signal S1.

M and N are for example equal respectively to 3 and 4.

Figure 2:
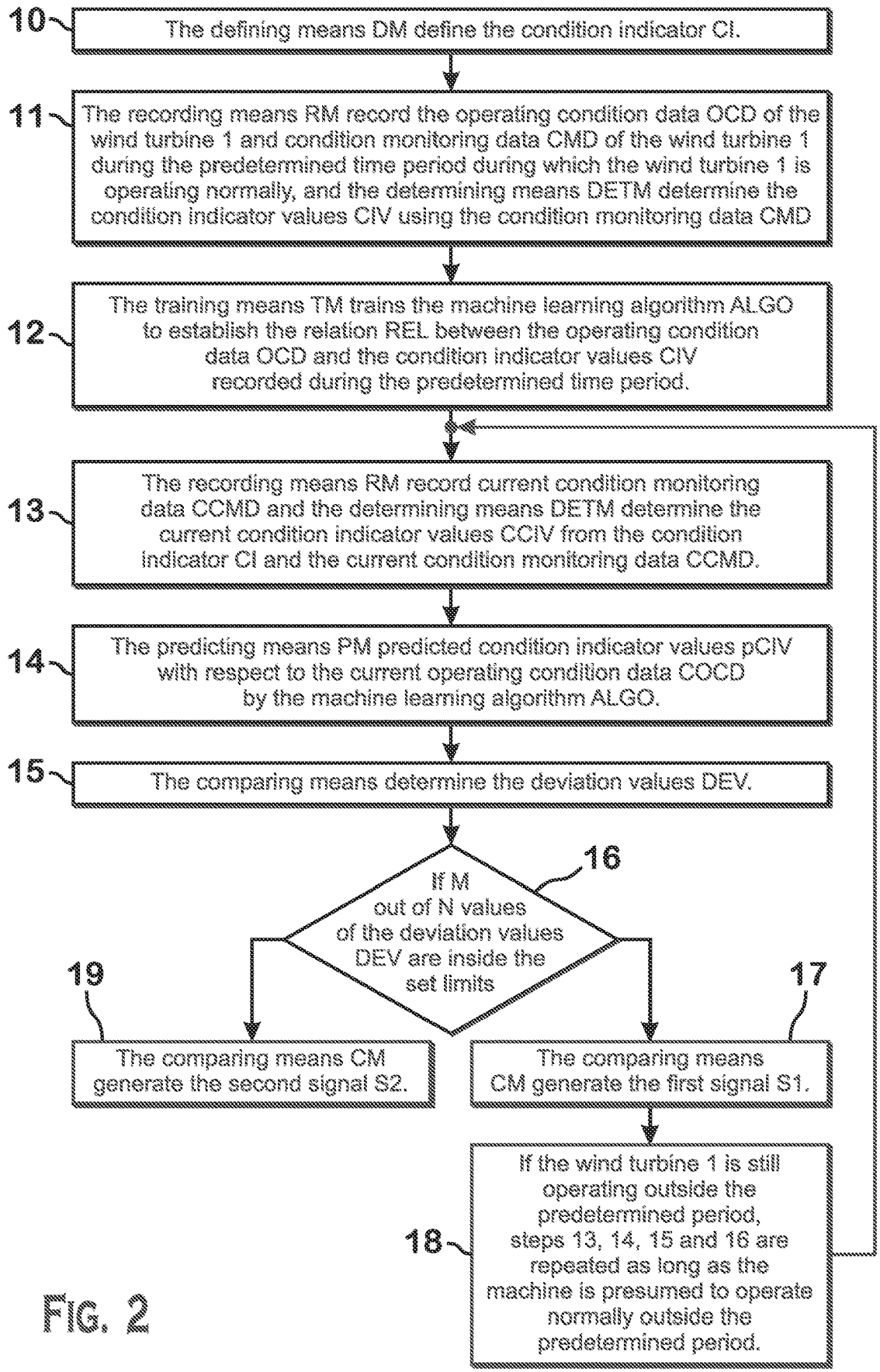
FIG. 2 illustrates an embodiment of a method for detecting wind turbine defects according to the invention.

FIG. 2 represents an embodiment of a method for detecting a defect of the bearing 3.

It is assumed that the lower limit LL value and the upper limit UL value are determined.

In step 10, the defining means DM define the condition indicator CI.

In step 11, the recording means RM record the operating condition data OCD of the wind turbine 1 and condition monitoring data CMD of the wind turbine 1 during the predetermined time period during which the wind turbine 1 is operating normally, and the determining means DETM determine the condition indicator values CVI using the condition monitoring data CMD.

In step 12, the training means TM trains the machine learning algorithm ALGO to establish the relation REL between the operating condition data OCD and the condition indicator values CIV recorded during the predetermined time period.

In step 13, the recording means RM record current condition monitoring data CCMD and the determining means DETM determine the current condition indicator values CCIV from the condition indicator CI and the current condition monitoring data CCMD.

In step 14, the predicting means PM predicted condition indicator values pCI with respect to the current operating condition data COCD by the machine learning algorithm ALGO.

In step 15, the comparing means determine the deviation values DEV.

If the deviation values are within the set limits LL, UL (step 16), in step 17, the comparing means CM generate the first signal S1.

In another embodiment, if M out of N values of the deviation values DEV are inside the set limits (step 16), in step 17, the comparing means CM generate the first signal S1.

Then, if the wind turbine 1 is still operating outside the predetermined period (step 18), steps 13, 14, 15 and 16 are repeated as long as the machine is presumed to operate normally outside the predetermined period.

For example, the steps 13, 14, 15 and 16 are repeated every day, every 10 minutes.

The duration of the steps repetition is determined according to the sensitivity of the defect detection.

If the deviation values are outside the set limits LL, UL (step 16), in step 19, the comparing means CM generate the second signal S2.

In another embodiment, if if M out of N values of the deviation values DEV are outside the set limits (step 16), in step 19, the comparing means CM generate the second signal S2.

The current condition indicator values, when the wind turbine 1 is operating normally, are predicted by the machine learning algorithm ALGO (predicted condition indicator values pCI) trained during the learning period and compared with the current condition indicator values based on the current operating condition data COCD.

Deviations between the predicted condition indicator values and the current condition indicator values are compared to set limits in order to determine if the deviations are representative of the monitored defect.

The current operating condition data are taken into account to make detection of defects more accurate.

In the illustrated example, one condition indicator CI reflecting the condition of the bearing 3 with respect to a defect to be monitored of the wind turbine 1 is analyzed.

In order to detect more defects, more condition indicators may be defined.

In another embodiment, the system 2 may detect a defect of another part of the wind turbine 1, for example the absolute value and variance of rotational speed of the bearing 3, the power output of the wind turbine 1, the wind speed and the direction of the wind driving the blades 4.

In another embodiment, the system 2 may detect at least one defect of another machine than a wind turbine, for example a rotating machine or a reciprocating machine such as a piston engine.

The invention claimed is:

1. A method for detecting at least one machine defect, the method comprising:
   a) defining from the machine kinematic data at least one condition indicator reflecting the condition of the machine, with respect to a defect to be monitored,
   b) recording operating condition data of the machine and condition monitoring data of the machine during a predetermined time period during which the machine is operating normally and determining condition indicator values using the condition monitoring data,
   c) training a machine learning algorithm to establish a relation between the operating condition data and the condition indicator values recorded during the predetermined time period,
   d) recording current condition monitoring data and determining current condition indicator values from the at least one condition indicator and the current condition monitoring data,
   e) predicting condition indicator values with respect to the current operating condition data by the machine learning algorithm,
   f) comparing the current condition indicator values and the predicted condition indicator values to determine a percentage of the current condition indicator values which are within a predetermined deviation of the predicted indicator values, and
   g) determining the machine's operating status by determining if the percentage of the current condition indicator values which are within the predetermined deviation of the predicted indicator values is less than or equal a predetermined percentage limit which indicates that the machine is presumed to be operating normally.

2. The method according to claim 1, wherein comparing the current condition indicator values and the predicted condition indicator values comprises determining the difference between the current condition indicator values and the predicted condition indicator values, if the difference is within set limits, the machine is presumed to operate normally.

3. The method according to claim 1, wherein steps d), e), f) and g) are repeated as long as the machine is presumed to operate normally outside the predetermined period.

4. The method according to claim 1, wherein comparing the current condition indicator values and the predicted condition indicator values comprises determining the difference between the current condition indicator values and the predicted condition indicator values, if the difference is outside set limits, the machine is presumed to have the monitored defect.

5. The method according to claim 1, wherein the machine learning algorithm comprises a neural network.

6. The method according to claim 1, wherein the machine comprises a wind turbine comprising a bearing supporting blades of the wind turbine, operating condition data and current operating condition data comprising the rotational speed of the bearing, the power output of the wind turbine and/or the wind speed and the wind direction.

* * * * *